(No Model.)
G. H. ZSCHECH.
FEED WATER HEATER.
No. 305,557. Patented Sept. 23, 1884.
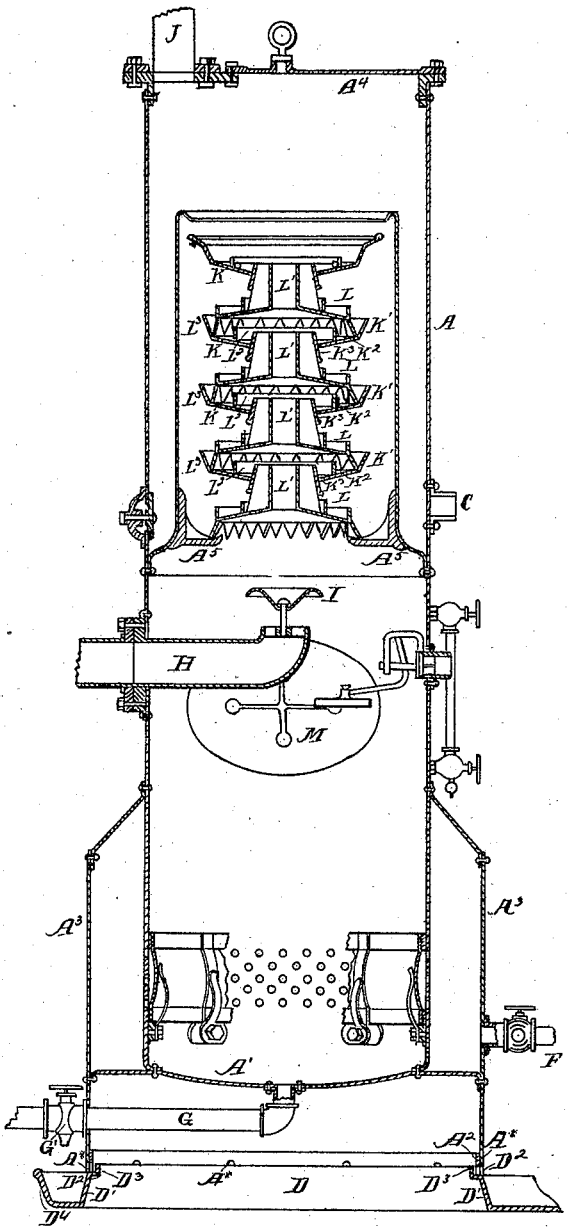
WITNESSES:
Wm. P. Robertson
Charles T. Moore
INVENTOR
Gustavus H. Zschech
BY
Thomas D. Stetson
ATTORNEY

UNITED STATES PATENT OFFICE.

GUSTAVUS H. ZSCHECH, OF INDIANAPOLIS, INDIANA.

FEED-WATER HEATER.

SPECIFICATION forming part of Letters Patent No. 305,557, dated September 23, 1884.

Application filed November 21, 1883. (No model.)

*To all whom it may concern:*

Be it known that I, GUSTAVUS H. ZSCHECH, of Indianapolis, Marion county, in the State of Indiana, have invented certain new and useful Improvements in Feed-Water Heaters and Purifiers, of which the following is a specification.

The general arrangement of my improved heater may be as that set forth in the United States Patent to me, dated September 14, 1880, No. 232,222. I have devised important improvements therein. I have simplified and cheapened the construction, and can obtain equally good or better results. The foreign matter held in the water is deposited and allowed to remain lodged in the liberal pockets provided in hollow cones. The heater being taken apart and thoroughly cleaned at intervals depending upon the foulness of the water, I can obtain pure feed-water without the expense of construction and maintenance of elaborate filters, or the liability to choking of the apparatus which is involved in the use of "filtering expedients," properly so called. However simply constructed, an apparatus of this kind is liable to leak. Small leaks need not compel the disuse of the apparatus, but they are liable to soil and injure the floor in the vicinity. I provide an annular pan of cast-iron or other suitable material, which performs the double function of supporting the heater and retaining the water escaping through any small leaks. In what I esteem the most complete form of the invention, the pan is of annular form, with provision at one point for discharging such water.

The accompanying drawing forms a part of this specification, and represents what I consider the best means of carrying out the invention.

The figure is a central vertical section of my improved heater.

Similar letters of reference indicate corresponding parts.

A is the main casing or body of the heater, certain portions being designated when necessary by additional marks, as A' A².

K K, &c., are inverted hollow cones, each having a considerable aperture at the apex, and L L, &c., corresponding upright hollow cones. Exhaust steam from an engine (not represented) is introduced through a liberal pipe, H, which is provided with a hood or deflecting-cone, I, to defend against falling water. The steam, after being allowed to act on the feed-water which is detained by the cones and the dams thereon, (which latter retain a considerable body of water, as will appear further on,) is allowed to escape through a pipe, J, at the top. The feed-water is introduced through a pipe, C, and is taken away through a pipe, F, near the bottom. The solid matter accumulating in the bottom is discharged at intervals through a mud-pipe, G, which extends out laterally above the pan, to be presently described, and is controlled by a valve, G'. On each of the inverted cones K is a rim, K', a series of annular dams, K², and a notched or open-work pendent lip, K³. The dams K² are made of such depth that the water flows back against the dam next above, thus making a series of still-water pools, into each of which the water is received gently from the pool above, and in the base of which the mud is allowed to collect quietly.

L L are a series of corresponding upright cones, each provided with a central pipe or flue, L', a series of annular dams, L², and a notched or open-work pendent lip, L³. The dams L² are made of such height that each retains a considerable pool of water, holding the water dead or quiet back against the base of the dam above.

A' is a horizontal plate of wrought or cast iron.

A² is a stout rim, projecting downward from the main body. The main cylindrical portion of the heater is marked A³. The cover A⁴, held by a few bolts, clips, or other slight fastenings, can be readily removed; and when this is away the several cones K L may be lifted off in succession, and readily cleaned and returned. The lowermost cone, L, rests on a series of brackets, A⁵, riveted or otherwise secured on the interior of A³.

D is an annular pan of cast-iron or other suitable material, certain portions of which will be denoted by additional letters, as D' D², when necessary.

D' is the inner upright, or nearly upright, side of the pan. Its upper edge is formed with a shelf, D², and lip D³, adapted to receive the rim A² of the heater-body. This rim has small notches A*, so that any leakage trickling down the inside of the rim can be caught by the lip D³ and conducted outward through the notches into the pan. The exterior, D⁴, of the pan D is flared and may be made ornamental, if desired. Any leakage trickling down the exterior flows directly into the pan D and is retained. Any leakage from the joint around the bottom plate, A', will be caught by the lip D³ and led outward into the pan through occasional notches A*.

A cock, G', on the drain-pipe G is arranged to discharge the water from the body of the heater into the pan. The heater may be emptied entirely in this way when required. The cock G' may be frequently opened for a moment to observe the condition of the water with regard to clearness. Care being taken to make the pipe G and its union with the bottom plate, A', especially strong and tight, the heater may stand in any position without danger of wetting or staining the floor.

Modifications may be made in the forms and proportions within wide limits. I can employ a greater or less number of the cones K L and of the dams K² L². The pan D may serve with some success if made to extend across the central space. I prefer the form shown for many reasons, among which is the accumulation of all the water, rust, &c., where it can be easily removed and every part kept clean and dry. The man-hole M may be made at the top above the cones instead of near the bottom, as represented; or I can have two or more man-holes at different places. Some or all may be of smaller size, and may be termed more properly "hand-holes," all having covers formed as shown. Numerous hand-holes distributed on different sides and at different levels may be of much service by allowing inspection and repairs of the cones and their dams and appurtenances without necessitating their removal. Parts of the invention may be used without the whole. The annular pan D should be provided with a sufficient escape-passage, E, to allow the entire contents of the heater to be discharged rapidly into it through the pipe G and cock G', and be conveyed away. The arrangement allows the opening of the cock G' for brief periods during the working, when a small steam will readily indicate what is the condition of the water. A strainer of coarse flannel or other suitable material is applied in the interior of the body near the base, covering a series of holes. This strainer is held in place by a series of springs, as shown, and insures the mechanical separation of all the coarser foreign matter from the water which passes out through these holes. The supply of the water for the boiler (not represented) is taken from the annular chamber which surrounds the base of the body. Where there is much lime in the water I can use any material presenting a large amount of surface, as brushwood or the like, in the interior of the body at the base by inserting and removing it through the man-hole, thus easily removing all the limy or other incrusting matter which will gather thereon.

I claim as my invention—

1. The heater-body A with its steam-connections H J, water-connections C F, and mud-pipe G, in combination with the annularly-formed pan D, having the lip D* on its interior side, D', with one or more notches, A*, therein, arranged to serve therewith as and for the purposes herein specified.

2. In a feed-water heater, the mud-pipe G and stop-cock or valve G', in combination with the body A and annular pan D, arranged, as shown, to discharge from the lowest point in the body into the pan on the exterior of the apparatus, substantially as and for the purposes herein specified.

In testimony whereof I have hereunto set my hand, at Indianapolis, Marion county, Indiana, this 29th day of September, 1883, in the presence of two subscribing witnesses.

GUSTAVUS H. ZSCHECH.

Witnesses:
LORENZ SCHMIDT,
THEO. REYER.